Figure 1:
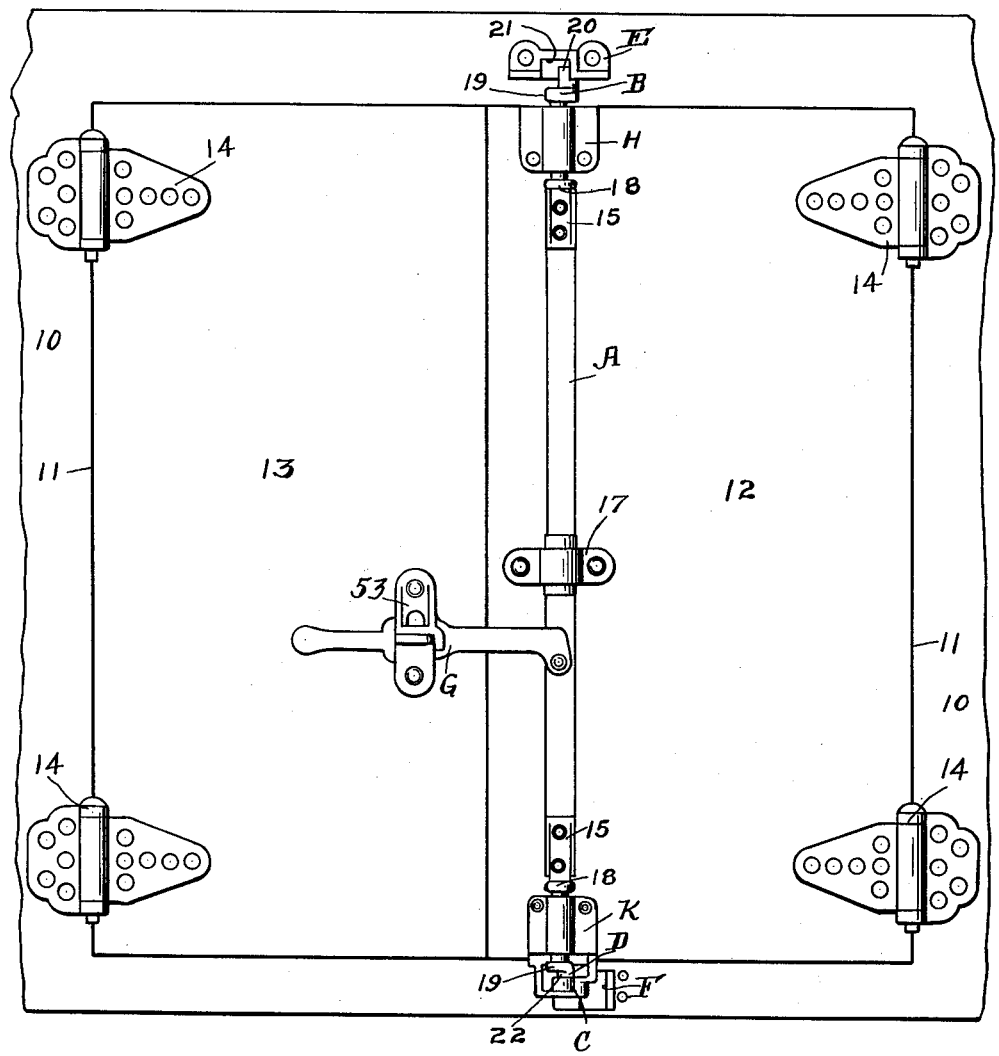

July 25, 1950     R. J. OLANDER     2,516,336
ROTARY BAR DOOR FASTENER
Filed April 24, 1947     3 Sheets-Sheet 2
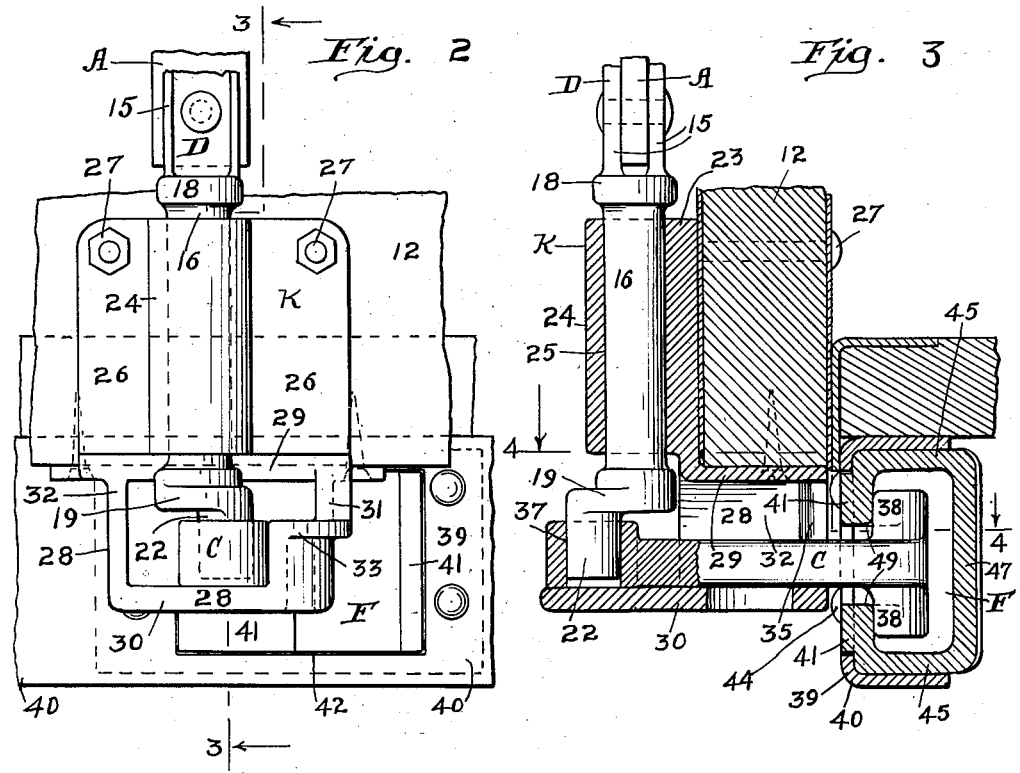
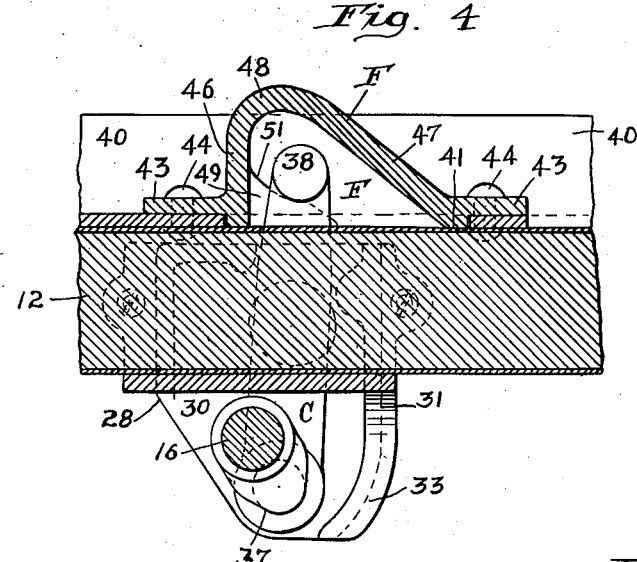
Inventor:
Roland J. Olander.
By Henry Fuchs
Atty.

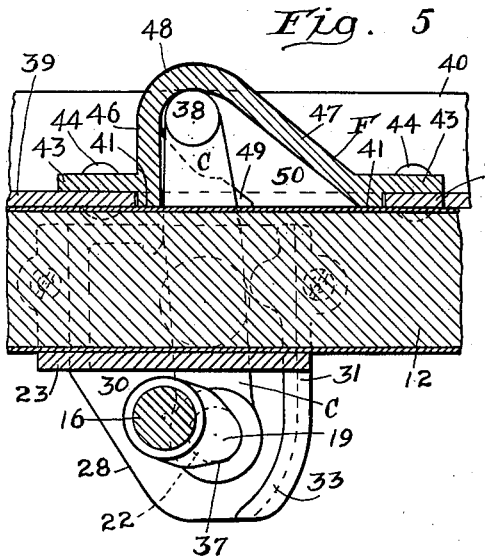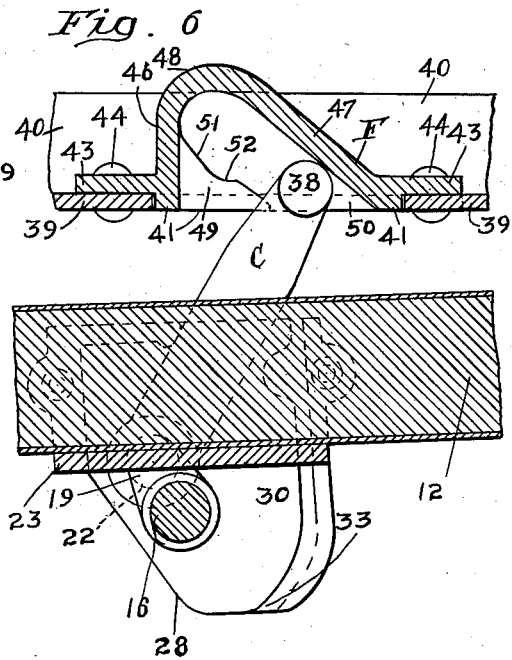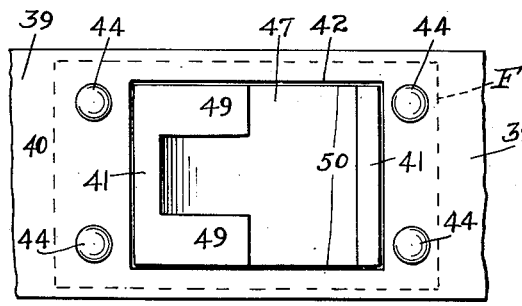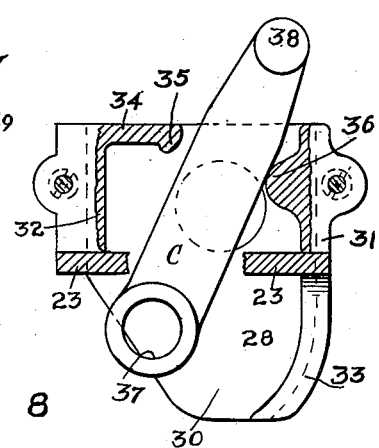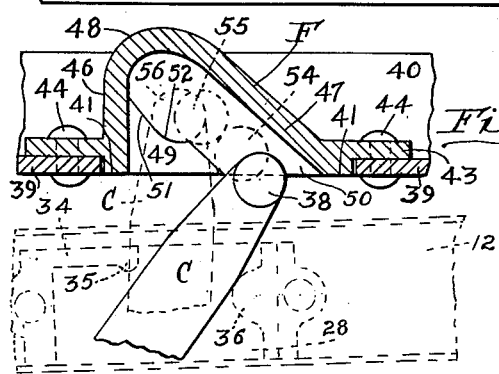

Patented July 25, 1950

2,516,336

UNITED STATES PATENT OFFICE 2,516,336

ROTARY BAR DOOR FASTENER

Roland J. Olander, Chicago, Ill., assignor to W. H. Miner, Inc., Chicago, Ill., a corporation of Delaware Application April 24, 1947, Serial No. 743,557

9 Claims. (Cl. 292—65)

This invention relates to improvements in rotary bar door fasteners for hinged doors, and more particularly for hinged doors of automobile trucks.

One object of the invention is to provide a door fastener for automobile trucks having the doors at the rear end of the truck body, comprising a rotary operating bar mounted on the truck door, having keeper engaging means at the top and bottom ends thereof, cooperating with keeper means mounted on the truck above and below the door opening, wherein the lower keeper is located inwardly of the rear end of the truck in out of the way position to protect the same against damage when the truck is backed against any object, such as a loading platform or wall of a building, and wherein the lower keeper engaging means is particularly designed to cooperate with a keeper so located.

A more specific object of the invention is to provide a door fastener of the character described in the preceding paragraph, wherein the lower keeper is provided with a cam slot and the lower keeper engaging means includes a link having a lug engageable in the cam slot of the keeper and actuated by a crank arm on the rotary operating bar to force the door open and closed by camming engagement with the keeper as the bar is rotated in reverse directions.

Other objects of the invention will more clearly appear from the description and claims hereinafter following.

In the accompanying drawings forming a part of this specification, Figure 1 is a rear elevational view of a portion of the body of an automobile truck provided with a door opening and a pair of hinged doors, showing the doors closed, and illustrating my improvements in connection therewith. Figure 2 is an enlarged elevational view of the mechanism at the lower left hand corner portion of the right hand door, as seen in Figure 1. Figure 3 is a vertical sectional view, corresponding substantially to the line 3—3 of Figure 2, showing the rotary operating bar in elevation, and the keeper engaging means at the lower end of the bar in elevation and partly in section. Figure 4 is a horizontal sectional view, corresponding substantially to the line 4—4 of Figure 3. Figures 5 and 6 are views similar to Figure 4, showing, respectively, the parts in the positions occupied at the beginning of the door opening operation and the positions of the same when the door has been forced partly open. Figure 7 is an elevational view of a portion of the end sill of the truck and the associated keeper. Figure 8 is a view, similar to Figure 4, showing the keeper engaging link member in full lines in position to enter the cam slot of the keeper at the beginning of the door closing operation, and illustrating in dotted circles the path of travel of the keeper engaging lugs of the link in camming the door shut, the door being shown in dotted lines and the keeper engaging link being shown in dotted lines in the position occupied when the door is completely closed. Figure 9 is a horizontal view, through the lower keeper, showing the link in plan, illustrating the manner of guiding the latter in its swinging movement.

In said drawings, 10 indicates the rear wall of the body of an automobile truck having a door opening 11 therein, closed by a pair of hinged doors 12 and 13. Each door is provided with the usual hinges 14—14 along the vertical outer side edges thereof. As is common practice, the door 12, which is that first closed, and the door 13 have their meeting edges beveled and so inclined that the door 12 will maintain the door 13 in closed position and wedge the same shut when the door fastener is actuated to force the door 12 closed.

Referring to the drawings, my improved door fastener comprises broadly a rotary operating or locking bar A, an upper keeper engaging crank member B on the bar, a lower keeper engaging link C, a crank member D at the lower end of the bar for actuating the link C, an upper keeper E, a lower keeper F, an operating handle lever G for the bar A, an upper bearing bracket H fixed to the door 12 and rotatably supporting the bar at its upper end, and a lower combined bearing and guide bracket K fixed to the door 12, rotatably supporting the bar at its lower end and supporting and guiding the link C for sliding and swinging movement.

The operating bar A is in the form of an elongated member of rectangular, transverse cross section and has the members B and D riveted thereto. Each member B and D has a forked portion 15 which embraces the bar A at opposite sides and has rivet members extending therethrough and through the bar. Outwardly of the forked portion, each end member has a cylindrical portion 16, which is rotatably supported in the corresponding bracket H or K. The upper bearing bracket H, which is fixed to the door 12 at the upper end thereof, is of well-known design, being of the usual character employed in door fasteners of the rotary bar type, and therefore needs no further description. Intermediate the brackets H and K, the bar is supported by a third bracket 17, also of the usual design, which is fixed to the door 12. Between the portions 15 and 16, each member B and D is enlarged to provide a collar, as indicated at 18, which forms an abutment shoulder adapted to limit endwise movement of the bar with respect to the corresponding bracket. At the outer end thereof, outwardly of the cylindrical bearing portion 16, each member B and D is provided with a radially projecting crank arm 19. The crank arm 19 of the upper member B has the usual keeper engaging pin 20 at its outer end, which has camming engagement with the upper keeper E and operates in the usual well-known manner in forcing the door open and closed. The keeper E is of the usual type employed in rotary door fasteners, being provided with an inclined cam slot 21 with which the pin 20 is engageable. The crank arm 19 of the member D has a crank pin 22 at its outer end, which operatively connects this crank arm to the keeper engaging link C, as hereinafter pointed out.

The combined bearing and guide bracket K, in which the cylindrical portion 16 of the crank member D is journaled, is vertically divided and comprises a back plate 23 and a cover plate 24, each provided with partial bearing openings, together forming the complete bearing opening of the bracket, which is in the form of a lengthwise extending, vertical bore 25, in which the cylindrical portion 16 is journaled. The cover plate 24 has securing flanges 26—26 at opposite sides thereof, and the bracket K is fixed to the door by bolts or similar securing elements 27, extending through the flanges 26—26, the back plate 23, and the door.

The back plate 23 is provided with a depending stirrup member 28, which is continuous with said plate and forms supporting and guide means for the keeper engaging link C. The main body portion of the stirrup member 28 extends rearwardly beneath the door 12 and comprises a horizontal top wall 29, a horizontal bottom wall 30, and laterally spaced side walls 31 and 32. The bottom wall 30 extends forwardly from the main body portion of the bracket to provide a projecting shelf portion, which forms a continuation of said bottom wall. Forwardly of the side wall 31, the shelf portion of the bottom wall is braced by an upstanding, laterally inwardly curved flange 33, along its edge, which is a continuation of the side wall 31. At the rear side thereof, the main body portion of the stirrup 28 is provided with a laterally inwardly extending, vertical wall 34, terminating in a thickened rounded edge portion forming a guide member or cam projection 35 for the link C. On the inner side thereof, the wall 34 has an inward enlargement thereon between its front and rear ends, which forms a rounded cam portion 36, which is located forwardly offset with respect to the cam projection 35 and is laterally spaced therefrom.

The keeper engaging link C is guided within the stirrup 28 for sliding and swinging movement, being supported on the bottom wall 30 and guided between the cam projections 35 and 36.

The front end of the link C is operatively connected to the outer end of the crank arm of the lower crank member D, the same being provided with a bearing opening 37 in which the crank pin 22 is journaled. The opposite or rear end of the link C extends rearwardly beyond the stirrup 28 and has vertically aligned, upstanding and depending keeper engaging cam lugs 38—38 at said end, forming, in effect, a T-headed cam portion, adapted to cooperate with the keeper F.

The keeper F, with which the link C is engageable, is in the form of a boxlike casting fixed to the inner side of the vertical web 39 of the end sill 40 of the automobile truck. The boxlike lower keeper F is open at the forward side and is provided with side flanges 41—41 bordering said opening, which fit in a rectangular opening 42 provided in the web of the end sill 40.

The keeper F also has laterally projecting flanges 43—43 at opposite sides thereof for mounting the same on the end sill 40, the keeper being riveted in place on the sill by rivets 44—44 extending through said flanges and the web 39 of the sill.

The main body of the boxlike keeper F comprises horizontally disposed, top and bottom walls 45—45, a rearwardly extending, relatively short, vertical side wall 46, and a vertical rear wall 47 inclined away from the web 39 of the sill 40. The wall 47 is rounded, as indicated at 48, at its junction with the side wall 46. As shown in Figures 4, 5, 6, and 8, the side wall 46 is at the left hand end of the keeper and the rear wall 47 extends from this wall to the right hand end of said keeper, being inclined away from the end sill in a direction from right to left.

The walls 45—45, 46, and 47 of the keeper define an outwardly opening pocket in which the T-shaped cam head of the link C is adapted to operate. Opposed to the inclined wall 47 at the front portion of the keeper, the top and bottom walls thereof are provided with depending and upstanding, aligned, inturned guide flanges 49—49 which extend from the wall 46 toward the opposite end of the keeper, but terminate short of said end, thus leaving openings 50—50 through which the cam lugs 38—38 of the link are adapted to freely pass. The flanges 49—49 are relatively wide and taper outwardly, as shown, the inner edges of the same being inclined in the same direction as the wall 47. The inner end portions of the inner edges of the flanges 49—49 are offset outwardly with respect to the outer end portions thereof, as indicated at 51—51. At the offset of the inner edge of each flange 49, the edge is rounded concavely to provide a seat 52 for the corresponding lug 38 of the link C. The vertical spacing between the flanges 49—49 is such as to freely accommodate the link C therebetween, this space being in the form of a guide slot in which the link C operates. As will be evident, the inclined inner edges of the flanges 49—49 and the opposite inclined wall 47 of the keeper F define, in effect, cam slots in which the cam lugs 38—38 of the link C operate.

The operating lever G, by which the bar A is rotated, is of the usual design, being pivotally secured to the bar A so that it may be dropped to pendant position. When in horizontal position, the lever G serves as a handle member for rotating the bar, and is locked to the usual latch means to secure the door in closed position. In operating the bar A by the lever, the latter has swinging movement in a horizontal path through an angle of approximately 180 degrees. The rotation of the bar A in reverse directions effects reciprocation of the keeper engaging link C, through the action of the lower crank member D, to slide the keeper inwardly and outwardly of the guide stirrup 28. While being thus reciprocated, the link is guided for lateral swinging movement by the cam projections 35 and 36.

The operation of my improved door fastener, is as follows: When the doors are in closed position and locked by the door fastener, the cam lugs 38—38 of the keeper engaging link C at the lower end of the bar A are engaged in the seats 52—52 of the cam flanges 49—49 of the keeper F, and the crank pin 20 of the crank member at the upper end of the bar is seated against the outer wall of the cam slot of the upper keeper E. To force the door 12 open, the operating bar A is rotated in contraclockwise direction, as viewed in Figure 4. Rotation of the bar in this direction forces the door open by camming engagement of the upper keeper engaging crank member B within the slot of the upper keeper E and by camming engagement of the link C with the lower keeper F, the upper keeper engaging member operating in the usual well-known manner. As the bar is thus being rotated, the keeper engaging link C is moved from the position shown in Figure 4, through the position shown in Figure 5, to the position shown in Figure 6, by rotation of the lower crank member D, the link being guided between the cam lugs 35 and 36 to swing and travel along the inclined wall 47 of the keeper F, positively forcing the door outwardly. As will be evident, when the parts reach the positions shown in Figure 6, the cam lugs 38—38 of the link C are positioned to pass through the openings 50—50 of the cam slots of the keeper F, permitting the door to be manually swung to fully open position.

In closing the door 12, the same is swung partially shut, thereby entering the keeper engaging crank pin 20 of the upper keeper engaging member and the keeper engaging lugs 38—38 of the link C within the openings of the keepers. With the parts thus positioned, rotation of the bar A in clockwise direction, as viewed in Figure 8, forces the door tightly closed by camming engagement in the usual manner of the upper keeper engaging crank member B with the keeper E, and camming engagement of the link C with the lower keeper F. As the bar A is thus rotated in clockwise direction, the lower crank member D actuates the link C, guided by the cam projections 35 and 36 of the stirrup 28, to move the same from the full line position shown in Figure 8 to the full line position shown in Figure 4, the cam lugs 38—38 of the link C travelling along the inner edges of the cam flanges 49—49, as shown diagrammatically by dotted circles 54, 55, and 56 in Figure 8, thereby forcing the door 12 tightly closed and locking it in said closed position by seating of the lugs 38—38 in the seats 52—52 of the flanges 49—49.

I claim:

1. In a door fastener for a hinged door of a container having a fixed keeper thereon inwardly of the plane of the door when closed, the combination with a rotary operating bar mounted on the door; of guide means on the door; and a sliding and laterally swingable keeper engaging member mounted on the door and actuated by said bar, said keeper engaging member having one end thereof projecting inwardly of the plane of the door and having a lug on said projecting end engageable with said keeper.

2. In a door fastener for a hinged door of a container having a fixed keeper mounted thereon inwardly of the plane of the door when closed, the combination with a rotary operating bar mounted on the door; of a crank member on said bar; a keeper engaging link actuated by said crank member; and guide means on the door for guiding the link for reciprocating and swinging movement, said link extending inwardly of the plane of the door and having keeper engaging means at the end thereof remote from said crank member.

3. In a door fastener for a hinged door of a container having a fixed slotted keeper mounted thereon, the combination with a rotary operating bar mounted on the door; of a crank arm extending radially from the end of the bar; a crank pin at the outer end of said arm; a link connected at one end to said crank pin of said crank arm and actuated by rotation of said bar; a guide for said link carried by the door for guiding the link for reciprocating and swinging movement; and a keeper engaging cam lug at the other end of said link engageable within the slot of said keeper.

4. In a door fastener for a hinged door of a container provided with a fixed keeper mounted thereon having a cam slot therein, the combination with a rotary operating bar supported on the door; of a crank arm extending radially from said bar; a link operatively connected at one end to said crank arm to be reciprocated thereby; a guide member on said door within which said link is slidable; cam projections on said guide member at opposite sides of said link for guiding said link for swinging movement as it is reciprocated; and a cam lug on the other end of said link engageable within the cam slot of said keeper.

5. In a door fastener for a hinged door of a container having a fixed outwardly opening slotted keeper mounted thereon adjacent said door, the combination with an operating bar rotatably supported on the door; of a supporting guide stirrup on the door; a link slidingly guided in said stirrup; a radially extending crank arm on said bar; a crank pin at the outer end of said arm journaled in one end of said link; guide means on said stirrup for guiding said link for swinging movement as it is reciprocated by rotation of said bar; and a keeper engaging cam lug at the other end of said link engageable within the slot of said keeper.

6. In a door fastener for a hinged door of a container, the combination with a rotary operating bar mounted on said door; of a keeper engaging member on said door actuated by rotation of said bar, said keeper engaging member having a T-headed cam portion presenting oppositely extending keeper engaging cam lugs.

7. In a door fastener for a hinged door of a container, the combination with a rotary operating bar on said door; of a radial crank arm on said bar; a link connected at one end to said crank arm to be reciprocated thereby; a guide member on said door slidably supporting said link; means on said guide member for guiding said link swinging movement as the same is reciprocated; and top and bottom keeper engaging cam lugs at the other end of said link.

8. In a door fastener for a hinged door of a container provided with a fixed keeper thereon mounted adjacent said door, and having an outwardly opening cam slot therein, the combination with an operating bar rotatably supported on the door; of a radially extending crank arm on said bar having a crank pin at the outer end thereof; a link connected at one end to said crank pin, and having a keeper engaging cam projection at the other end engageable within the cam slot of said keeper; a guide stirrup on said door in which said link is slidingly guided for in and out movement; and guide projections at opposite sides of said stirrup between which said link is slidable and guided for swinging movement of the end thereof which is provided with the keeper engaging cam projection.

9. In a door fastener for a hinged door of a container provided with a fixed keeper mounted below said door and having an outwardly opening cam slot therein, the combination with a vertically disposed, rotary operating bar on the door; of a depending guide stirrup on the door extending beneath the same; a link horizontally slidable in said guide stirrup; a crank member operatively connecting the outer end of said link to said bar to be reciprocated by rotation of the latter; keeper engaging cam means on the inner ends of said link operatively engageable within the slot of said keeper; and means on said stirrup for guiding said link for swinging movement about the connection thereof with said crank member to effect camming action of said keeper engaging means in the cam slot of said keeper to operate said door.

ROLAND J. OLANDER.

REFERENCES CITED

The following references are of record in the file of this patent:

UNITED STATES PATENTS

| Number | Name | Date |
|---|---|---|
| 1,930,685 | Lehman | Oct. 17, 1933 |
| 1,952,112 | Bartsch | Mar. 27, 1934 |
| 2,301,444 | Olander | Nov. 10, 1942 |

FOREIGN PATENTS

| Number | Country | Date |
|---|---|---|
| 71,914 | Austria | June 10, 1916 |